| United States Patent [19] | [11] | 4,207,354 |
|---|---|---|
| Haga et al. | [45] | Jun. 10, 1980 |

[54] METHOD FOR PROCESSING FISH CONTAMINATED WITH SPOROZOA

[75] Inventors: Hiroshi Haga, Machida; Ritsuo Shigeoka; Takafumi Yamauchi, both of Hachioji, Japan

[73] Assignee: Nippon Suisan Kabushiki Kaisha, Tokyo, Japan

[21] Appl. No.: 956,997

[22] Filed: Oct. 31, 1978

[30] Foreign Application Priority Data

Apr. 10, 1978 [JP] Japan ................................. 53-41863

[51] Int. Cl.$^2$ ........................................... A22C 25/00
[52] U.S. Cl. .................................. 426/574; 426/614; 426/643; 426/657
[58] Field of Search ............... 426/656, 643, 574, 614, 426/657

[56] References Cited

U.S. PATENT DOCUMENTS

| 3,904,776 | 9/1975 | Magnino et al. | 426/643 X |
| 3,922,372 | 11/1975 | Hasegawa | 426/643 X |
| 4,062,409 | 12/1977 | Niki et al. | 426/643 |
| 4,118,517 | 10/1978 | Niki et al. | 426/643 X |

OTHER PUBLICATIONS

Altschul "New Protein Foods" Academic Press (1974), pp. 435-440.

*Primary Examiner*—R. B. Penland
*Attorney, Agent, or Firm*—Wenderoth, Lind & Ponack

[57] ABSTRACT

Sporozoa-contaminated fish meat can be processed to coagulated fish meat paste ("neriseihin") by admixing about 4 to 40 parts of egg white with 100 parts of the fish meat.

4 Claims, No Drawings

METHOD FOR PROCESSING FISH CONTAMINATED WITH SPOROZOA

BACKGROUND OF THE INVENTION

The present invention relates to a method for processing fish meat contaminated with sporozoa. More specifically, it is concerned with a method for processing fish meat of fish containing jellied meat due to contamination with sporozoa, whereby it is possible to produce "neriseihin" (fish meat paste products) having adequate elasticity from the meat having jellied meat which otherwise cannot be used as a raw material for "neriseihin" because of its lack of gel-forming capability.

When salt is added to raw fish meat undergoing grinding, myosins, which are soluble, in salt solution are dissolved out from the meat to form a "sol", which is very adhesive. When this adhesive raw ground meat is heated, the "sol" converts to "gel", which forms a network construction, and this gel imparts elasticity to the fish meat paste. Such elastic fish meat is called "neriseihin" (Japanese style fish meat paste product) in Japan, and fish meat which forms a strong "gel" is referred to as fish meat having a good gel-forming capability.

In Japan, unique types of coagulated fish meat pastes have been processed from ancient times. Although their origin is not entirely known, the Japanese style fish meat paste is said to have been processed as early as in the 15th century, according to old literature. The first product was "chikuwa" (literally "bamboo-ring") which is ground fish meat paste coated around a bamboo stick to a considerable thickness and heated. When the bamboo is pulled out after the processing, the coagulated fish meat paste forms a tubular round rod. The name "chikuwa" remains and the form has been kept to the present time. Next, the paste piled up on a thin rectangular wooden board appeared. This has been called "kamaboko". Thereafter, "hanpen" and "sumaki" appeared. "Hanpen" is a small disc-shaped fish meat paste product, and the raw material and processing method thereof and of "sumaki" are almost the same as those of "kamaboko" except for the appearance of the exterior which is covered with straw. The present Japanese style coagulated fish meat paste products thus derived from ground fish meat are of various shapes, and various heat coagulation methods are employed in their production.

The various kinds of Japanese style fish meat paste products are classified according to heating method as follows: Steamed articles: "mushi-kamaboko", "sumaki", etc.; broiled articles: "yaki-kamaboko", "yaki-chikuwa", "datemaki", "atsu-yaki", etc.; fried articles: "satsuma-age", "age-kamaboko", etc.

Jellied meat is also called "milky meat", "chalky meat", etc., and this generally refers to jellied fish meat which is spotted or soft as a whole. The jellied meat gives off no offensive smell and exhibits no significant variation in pH. This is a unique phenomenon of fish meat which is entirely different from decomposition or putrefaction. It is known that jellied meat occurs in fishes on which a certain kind of sporozoa is parasitic. Jellied meat does not occur while the host fish on which sporozoa are parasitic is living, but develops and rapidly propagates after the host has died due to the action of the sporozoa that are parasitic on the host. For this reason, it is very difficult to discern the initial change from outer appearance. Further, because there has hitherto been no appropriate countermeasure against the progress of such a phenomenon, jellied meat has been occurring in fish a very short time after they are caught, detracting greatly from their commercial value.

The sporozoa to which jellied meat is ascribable belong to the *Unicapsla genus*, *Chloromyxum genus*, *Kudoa genus* and the like of *Myxosoporida* which belongs to *Cnidosporidae*, Sporozoa of Protozoa. These sporozoa in themselves have a parasitic characteristic with respect to hematocryal vertebrata comprised primarily of fishes and are never parasitic with respect to human beings. Accordingly, the jellied meat when eaten is harmless to the human body. It is apparent that in the countries, e.g., Japan, where fish are customarily eaten raw, jellied meat in its initial stage is undoubtedly being unconsciously eaten. However, there has been no incidence of health trouble attributable to jellied meat. Much less would a "neriseihin", which is subjected to heat treatment, present any problem what so ever from the standpoint of food sanitation. Moreover, the term "sporozoa", as used herein, refers to *Myxosporida*.

Attempts have heretofore been made to utilize the fish meat of fish containing jellied meat as a raw material for "neriseihin". However, all of these attempts have as yet failed to produce satisfactory results. In general, in order to make a high quality "kamaboko" which has high elasticity, chopped fish meat must be soaked in cold water for several hours to remove fat, blood, odorous substances, and water-soluble proteins. The cold water is changed two or three times during the soaking. In general, the less fresh the fish meat is, the longer is the soaking time required.

Now, in the case of meat obtained from fish containing jellied meat, even when the frequency of the process of soaking in water is increased, or the soaking and dehydration procedures are carefully conducted, or the addition ratio of sugar or condensated polyphosphates is increased, the dehydrated fish meat has little gel-forming capability and is unsuitable for use as a raw material for fish-based "neriseihin", such as "kamaboko" and "chikuwa", which require a high gel-forming capability. Also, even when such dehydrated fish meat is incorporated into a normal raw ground fish meat, it reduces the gel-forming capability of the normal raw ground fish meat and, in extreme cases, results in a total loss thereof. Accordingly, fish meat containing jellied meat cannot be used even as a filler in normal raw ground fish meat. The fact is that a "neriseihin" raw material having a commercial value has not been obtainable from the meat of fishes containing jellied meat.

In view of the above described circumstances, we have carried out studies toward making the abundantly available but unused protein resources commercially useful and valuable, i.e., toward providing a method for processing the meat of fish containing jellied meat by which the fish meat can be used as a raw material for "neriseihin". As a result, we have found that by adding egg white to the meat of fishes containing jellied meat, it is possible to produce from the fish meat a "neriseihin" having a characteristic elasticity and to prevent any marked reduction in gel-forming capability that is encountered upon addition of the fish meat of fishes containing jellied meat to normal raw ground fish meat. This invention is based on these findings.

SUMMARY OF THE INVENTION

Accordingly, this invention provides a method for processing fish meat of fish containing jellied meat due to contamination with sporozoa characterized by the addition of egg white in a quantity of the order of from 4 to 40 parts, calculated on the basis of fresh white, to 100 parts of the fish meat.

The nature, utility, and further features of this invention will be more clearly apparent from the following detailed description beginning with a consideration of general aspects of the invention and concluding with specific examples of practice illustrating preferred embodiments of the invention.

DETAILED DESCRIPTION

In the present invention, any fish in which jellied meat occurs because of parasitism of the above mentioned sporozoa can be used. These fish are distributed over a wide variety of fish species and all waters of the world, although the degree of parasitism of the sporozoa will vary. Examples of such fish are hake of the North Pacific, South Pacific (off the coast of Chile and Peru) and South Atlantic (Africa, South America), Australian barracuda, North Pacific flat-fish, such as halibut and arrow-toothed flounder, tuna and swordfish of the Pacific, Atlantic and Indian Oceans and Japanese waters. Many of these fish are reported to have sporozoa belonging to the *Chloromyxum genus* and their representative sporozoa are *Chloromyxum thyrsites*. Whether fresh or frozen, these fish can be used as a raw material in the present invention.

Examples of the egg white usable for the present invention are the fresh white, frozen white, condensed white, dried white and whole egg of hen. The egg white of a fowl, other than hen, such as duck, can also be used. The following description relates to the use of egg white of hen.

The egg white is added in a quantity of the order of 4 to 40 parts, preferably 10 to 20 parts, of fresh white to 100 parts of raw material fish meat. Where condensed egg white or dried egg white is used, it may be added in a quantity corresponding to fresh egg white (moisture content; about 89%) in consideration of their respective moisture content. For example, in the case of dried egg white (moisture content: about 9.5%), the addition thereof in a quantity of about 0.5 to 5 parts corresponds to the above stated addition ratio. In the case where the addition ratio of the egg white is lower than the above mentioned range, the desired result cannot be achieved and it is impossible to obtain a raw material suitable for producing a "neriseihin" having a great gel-forming capability. On the other hand, when the white is added in a ratio greater than the above given range, the resulting "neriseihin" possesses the property of heat-coagulated white, and the feel of resilience and resistance to chewing "kamaboko" which is characteristic of "neriseihin", is reduced. As a result, the "neriseihin" becomes brittle and gives off a strong smell of the egg white, which reduces the organoleptic quality of the "neriseihin".

The egg white may be added to fish meat collected by a meat separator at any time during the subsequent processing steps. Moreover, the addition of the white results in advantageous effect irrespective of whether or not the fish meat is soaked in water. For example, when fish meat is processed according to the procedure shown in the diagram set forth below, the white may be added before or immediately after soaking in water or at the time of grinding. In the case where soaking is excluded from the following procedure, the white is preferably added immediately after the fish meat is put through the meat separator or at the time of grinding. Moreover, when freezing and thawing process steps are adopted after meat separation or soaking, the white may be added before freezing or at the time of grinding after thawing.

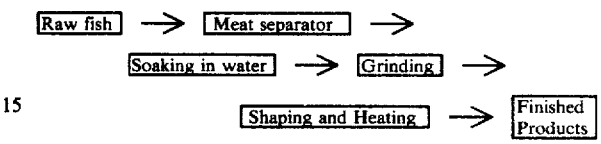

The principal feature of the present invention lies in the addition of egg white. However, even if the white is added to a normal raw ground fish meat, the effect of the addition can be scarcely recognizable because the raw ground fish meat itself has great gel-forming capability characteristic of "neriseihin". On the other hand, the effect of the addition of egg white is pronounced in the case of meat of fish containing jellied meat because the fish meat treated with egg white produces "neriseihin" having a characteristic strong gel-forming capability, while a fish meat without the white cannot provide such a "neriseihin".

The present invention makes it possible to use the large fish resources which could not be utilized hitherto. By the present invention, the meat of fish which could not heretofore be used as a raw material for "neriseihin" because of their lack of gel-forming capability can now be used as a raw material for "neriseihin" having adequate elasticity. Moreover, through application of the present invention, the marked deterioration which occurs in the gel-forming capability of "neriseihin" when jellied meat is added to normal raw ground fish meat can be effectively prevented.

The evaluation or measurement of "neriseihin" in Japan will now be described.

Elasticity ("ashi") is an important property in the evaluation of the quality of Japanese style fish meat paste products. The quantity of "ashi" has been measured by various methods by researchers. For example, Okada has made a jelly strength meter, in which a load by way of a plunger on the elastic material can be weighed. In general, the heavier the load reading, the greater is the elasticity. The twofold and fourfold method is a kind of organoleptic method of estimating elasticity by measuring the generated crack length. The teeth biting method is a kind of organoleptic method of estimating elasticity by biting. Skilled panels are able to estimate the elasticity of "kamaboko" in a very short time.

As the elasticity of Japanese style fish meat paste products is influenced by various factors, for example, the kind of fish, fishing season or area, freshness of meat, pH value of meat, the amount of salt added, and the amount of ingredients added, elasticity must be estimated under definite conditions. In Japan, elasticity is evaluated on the basis of model products prepared by:

1. Grinding the chopped meat for 5 minutes;
2. Thereafter grinding the meat for another 15 minutes, adding 2.7% of NaCl;
3. Thereafter grinding the meat for another 10 minutes;

4. Charging the ground meat into plastic film casing;
5. Boiling the encased meat for 50 minutes at 90° C.; and
6. Cooling the meat to room temperature.

The elasticity of the product is evaluated by three methods, namely, jelly strength method, twofold and fourfold method, and biting method.

The following example will illustrate the present invention in more detail. In this specification, all quantities in "parts" and "percentages" are by weight. In the following examples, the jelly strength is measured with the Okada-type jelly strength meter using a plunger having a diameter of 5 mm. A round sliced sample having a thickness of 3 mm was evaluated for folding property according to the following five grades: AA: no crack by fourfold, A: no crack by twofold, B: a little crack by twofold, C: crack over approximately half the diameter by twofold, and D: crack throughout the sample surface by twofold. The teeth biting quality was evaluated according to the following standards: 5: very good, 4: good, 3: fair, 2: slightly poor, 1: poor.

Test example

Frozen Pacific hake (*Merluccius productus*) containing spotted jellied meat was thawed. Then, the head, internal organs and intermediate bones were removed from the hake to produce fillets and fish meat was collected from the fillets by means of a meat separator. Soaking was conducted three times by stirring the fish meat in water of a quantity three times that of the fish meat, and the fish meat was then drained of water to recover the fish meat.

Dried egg white (moisture content 9.5%) in the quantity set forth in Table 1 was dissolved in water, and the aqueous solution was added in a quantity of 0.3 to 6.0 parts as dried white to 100 parts of the fish meat. Thereafter, the moisture content was adjusted to provide kneaded meat with almost the same moisture content. Separately, a kneaded fish meat without egg white was prepared as a control. These kneaded fish meats were subjected to a conventional method of testing the elasticity to examine the quality of the fish meat as a raw material for "neriseihin". The results are shown in Table 1.

In testing the elasticity, the above described kneaded fish meats with and without the addition of egg white were ground for 5 minutes and then ground with the addition of 2.7% of table salt for another 15 minutes and finally ground with the addition of 5% of potato starch for still another 10 minutes. Thereafter, the ground fish meats were charged into a synthetic resin tube and boiled at a temperature of 90° C. for 50 minutes. After cooling, samples were obtained. The samples were tested for jelly strength, twofold and fourfold cracking, and biting quality.

Table 1

| Quantity of dried egg white added (parts) | Jelly strength | Twofold and fourfold cracking | Biting |
|---|---|---|---|
| 0 | 105 | D | 1 |
| 0.3 | 157 | C-D | 1 |
| 0.5 | 319 | A | 3-4 |
| 1.5 | 340 | AA | 4 |
| 3.0 | 393 | AA | 4-5 |
| 4.5 | 428 | AA | 4 |
| 6.0 | 413 | A | 2 |

With 0.3 part of dried egg white, "tsumire"-like "neriseihin"-was produced, while with more than 0.5 part of dried egg white, "neriseihin" having a strong gel-forming capability was produced. In the case where the white was added in a quantity greater than 6 parts, the brittleness of heat coagulated white appeared, and the finished product gave off the smell of the egg white, which impaired the flavor of the product.

EXAMPLE 1

Frozen Chilean hake (*Merluccius guyi*) containing spotted jellied meat was thawed. Then, fish meat was collected from the thawed hake by means of a meat separator. The fish meat was soaked in water and drained to obtain 50 Kg of dehydrated meat. 5 Kg of fresh white was added to the dehydrated meat before it was ground with addition of table salt. Thereafter, 2.5 Kg of sugar, 1.5 Kg of table salt, 4.0 Kg of starch, 1.2 Kg of "Mirin" and 0.5 Kg of sodium glutamate were added to the ground meat, and the mixture was ground and formed into "itatsuki-Kamaboko" according to a conventional method.

"Mirin" is a kind of wine used as seasoning in Japan. This seasoning, made from waxy rice by fermentation, is rich in glucose and various amino acids. Sodium glutamate is a most popular seasoning in Japan, being a kind of amino acid and used widely in cooking and various food processing.

When shaping "kamaboko", the seasoned ground meat is made to adhere by its own adhesiveness to a thin wooden board, usually in the shape of a quonset hut, for which reason it is called "itatsuki-kamaboko" or "kamaboko on wooden board".

A control "itatsuki-kamaboko" was prepared according to the procedure described above, except that egg white was not added. These "kamaboko"s were evaluated for quality under the same conditions as those for the above described method of testing elasticity. The results are shown in Table 2.

Table 2

|  | Control | Sample |
|---|---|---|
| Jelly strength | 156 | 438 |
| Twofold and Fourfold | D | AA |
| Biting | 1 | 4 |

It is apparent from the above results that by the addition of about 10% of the white to the hake containing spotted jellied meat, it is possible to produce "neriseihin" having a strong gel-forming capability. The product prepared in this example was equivalent to a conventional "kamaboko" on the point of flavor.

EXAMPLE 2

Immediately after been caught, North Pacific hake were treated aboard the boat in the same manner as that described in Example 1 to obtain 50 Kg of dehydrated fish meat. 10 Kg of fresh white (20%), 3.5 Kg of sugar and 150 g of condensed polyphosphates (an equal-quantity mixture of sodium pyrophosphate and sodium polyphosphate) were added to the dehydrated meat and the mixture was kneaded and stored in a frozen state for 3 months.

A control was also prepared according to the same manner described above, except that egg white was not added. Similarly, the control meat was stored in a frozen state. These model meat preparations were tested for elasticity. The results are shown in Table 3.

Table 3

|  | Control (without egg whites) | Sample (With egg white) |
|---|---|---|
| Jelly strength | 111 | 386 |
| Twofold and Fourfold | D | AA |
| Biting | 1 | 4 |

It is apparent from the above results that when the white is added to the dehydrated meat, the meat can possess strong gel-forming capability even if it is stored in a frozen state.

10.0 Kg of the above kneaded meat, 3.0 Kg of carrots, 1.0 Kg of starch, 0.3 Kg of table salt, 0.3 Kg of Mirin, 0.05 Kg of sodium glutamate and 0.02 Kg of other seasonings were mixed and the mixture was processed into a "satsuma-age"-like"agemono". The control exhibited "tsumire" appearance and had poor bite properties, while the sample had good resistance to the teeth when bitten and good flavor, and it was judged to be suitable as a raw material for fish-based "neriseihin".

"Satsuma-age" is a product made of ground fish meat prepared by the same procedure as "kamaboko" and then fried in deep fat instead of heating by steaming. "Agemono" is a general term for fried fish meat paste. All Japanese style fish meat pastes have a heat-coagulation process as the last step. Although "kamaboko" is made by steaming in general, "agemono" is made by frying in deep fat.

EXAMPLE 3

Frozen arrow-toothed flounder (*Atheresthes evermanni*) from the North Pacific Aleutian waters was treated in the same manner as that described in Example 1 to obtain 50 Kg of dehydrated fish meat. 1.5 Kg of dried egg white (moisture content: 9.5%), 3.5 Kg of sugar and 150 g of condensed polyphosphates were added to the dehydrated fish meat, and the mixture was kneaded and stored in a frozen state for 1 month, after which the frozen meat and highest quality ground pollack meat made by a factory ship were thawed and 30% of the meat and 70% of the ground pollack meat were mixed and kneaded.

A control kneaded meat was prepared in the manner described above except that the dried white was not added. These kneaded meats and the ground pollack meat alone were respectively tested for elasticity. The results were as shown in Table 4.

Table 4

|  | Ground pollack meat | Control | Sample |
|---|---|---|---|
| Jelly strength | 660 | 270 | 530 |
| Twofold and fourfold | AA | C | AA |
| Biting | 5 | 2 | 5 |

It is apparent from the above results that when the kneaded meat without the white is mixed with ground pollack meat, the mixture exhibits poor elasticity and bite feel, while the mixture of the kneaded meat with the white and ground pollack meat provides good results.

20.0 Kg of the above kneaded meat, 45.0 Kg of the ground pollack meat, 10.0 Kg of lard, 10.0 Kg of gelatin, 10.0 Kg of starch, 2.7 Kg of table salt and 2.3 Kg of seasonings were mixed and the mixture was processed into a fish meat sausage. The control meat provided a sausage which was unsatisfactory in quality, i.e. exhibited poor resistance to the teeth, poor elasticity, etc., while the sample meat resulted in a sausage equivalent in quality to commerically available fish meat sausage. Accordingly, the fish meat with egg white added was found to be satisfactory as a raw material for "neriseihin".

We claim:

1. A process for producing coagulated fish meat paste from raw fish meat containing jellied meat due to contamination with sporozoa comprising:
   (1) washing said raw contaminated fish meat in water;
   (2) removing said water by pressing or centrifuging;
   (3) grinding said washed raw contaminated fish meat;
   (4) adding at any point from steps (1) to (3), inclusive, from 4–40 parts by weight of egg white to 100 parts by weight of said contaminated fish meat;
   (5) shaping said ground, soaked, treated, raw contaminated fish meat and
   (6) cooking said treated contaminated fish meat to produce a coagulated fish meat paste.

2. The method as claimed in claim 1 wherein egg white is selected from the group consisting of fresh egg white, frozen egg white, condensed egg white, dried egg white, and fresh whole egg.

3. The method as claimed in claim 1 or 2 wherein egg white is from the eggs of any fowl.

4. The method as claimed in claim 1 wherein the fish is a fish selected from the group consisting of fresh fish and frozen fish which has been thawed.

* * * * *